United States Patent [19]
Yamada

[11] Patent Number: 5,815,287
[45] Date of Patent: Sep. 29, 1998

[54] IMAGE FORMING PROCESSOR HAVING FIRST AND SECOND IMAGE PROCESSING SECTIONS

[75] Inventor: Hirokazu Yamada, Kobe, Japan

[73] Assignee: Minolta Co., Ltd., Osaka, Japan

[21] Appl. No.: 554,411

[22] Filed: Nov. 6, 1995

[30] Foreign Application Priority Data

Nov. 10, 1994 [JP] Japan ................................ 6-276352 U
Nov. 10, 1994 [JP] Japan .................................. 6-276353

[51] Int. Cl.$^6$ ...................................................... H04N 1/40
[52] U.S. Cl. ............................................ 358/458; 358/456
[58] Field of Search ........................... 358/429, 456–459, 358/465–467, 534–536

[56] References Cited

U.S. PATENT DOCUMENTS

| | | | |
|---|---|---|---|
| 4,547,811 | 10/1985 | Ochi et al. ................................ | 358/280 |
| 4,723,173 | 2/1988 | Tanioka .................... | 358/457 |
| 4,893,188 | 1/1990 | Murakami et al. ...................... | 358/464 |
| 4,996,603 | 2/1991 | Kanemitsu et al. ..................... | 358/462 |

FOREIGN PATENT DOCUMENTS 5-30354  2/1993  Japan .

*Primary Examiner*—Edward L. Coles, Sr.
*Assistant Examiner*—Stephen Brinich
*Attorney, Agent, or Firm*—Burns, Doane, Swecker & Mathis, LLP

[57] ABSTRACT

An image processor for parallel image processing includes a first image processing section which binarizes first image data by using a variable area tone method and a second image processing section which executes a smoothing process with respect to second image data. A data separator divides image data into first image data corresponding to halftone image regions and second image data corresponding to binary image regions. The first image data is transmitted to the first image processing section while the second image data is transmitted to the second image processing section. A data delay section is provided at an upstream side of the first image processing section to delay image data for the required processing time difference between the first image process and the second image process. A data combining section combines the image data output from the first image processing section and the second image processing section to produce combined image data which is transmitted to an image forming system.

20 Claims, 8 Drawing Sheets

IMAGE FORMING PROCESSOR HAVING FIRST AND SECOND IMAGE PROCESSING SECTIONS

BACKGROUND OF THE INVENTION

1. Field of the Invention

The present invention relates to an image processor, and more particularly to an image processor for parallel image processing of image data simultaneously by different image processing methods.

2. Description of the Related Art

In known image forming apparatus such as page printers, digital copiers, facsimile machines and the like, variable area tone methods such as dithering, density patterns and the like are used as tone reproduction methods for outputting a halftone image on paper.

For example, dithering methods use a threshold value for each dot in an m×n dot matrix to binarize multilevel image data (halftone image data) of each picture element of an original document image. Dithering comprises two types of methods, a dot concentration type (fattening type) wherein a threshold value is allocated to a matrix to concentrate printed dots in the center of a matrix, and a dot distribution type (Bayer type) wherein a threshold value is allocated to a matrix to distribute printed dots in a matrix.

In electrophotographic image formation processes, when the dot distribution type matrix is used, high gamma (high density) recording characteristics result from the influence of the intensity distribution of the laser or other exposure light. Thus, the dot concentration method is usually used.

When the dot concentration method is used, however, resolution is reduced as the matrix size is increased to increase the number of tone gradations, and the number of tone gradations is reduced when the matrix size is reduced to improve resolution.

A method combining a modification of the dot concentration type matrix and pulse width modulation to divide single picture elements (IH method) has been proposed as a recording method to achieve compatibility between both tone and resolution (Publication of the Society of Electrophotography of Japan, vol. 25 no. 1, 1986; p.34). The number of expressible tones r possible by the aforesaid IH method is expressed as r=m×m×R×0.5+1, wherein R is the number of dot divisions by pulse width modulation, m×m is the size of the matrix, and total white space is included. This method produces higher resolution output than the aforesaid dithering methods.

On the other hand, halftone reproduction processes for binary images such as letters and lines and the like produce Moire stripes in the reproduced image which readily cause an edge cutting phenomenon wherein the edges of the letters or fine lines are broken. Smoothing processes to smooth out contours are especially desirable in the case of curves and diagonal lines of enlarged letters.

According to one method, an original document image may be divided into binary regions and halftone regions, and processing of said respective regions may be executed separately. However, it is difficult to accurately differentiate binary regions and halftone regions.

Generally, conventional image processors execute a filtering process for multi-level image data using a two-dimensional window to set a smoothing coefficient, and thereafter perform the tone reproduction process. That is, the data values (density) of the target picture elements are subjected to a smoothing process to correct calculations based on tone reproduction and picture element density in said window, and a tone reproduction process to convert the corrected multi-level data to data for tone reproduction.

Other conventional image processors temporarily separate input image data into binary regions and halftone regions in picture element units. The binary regions are subjected to smoothing processing and the halftone regions are subjected to halftone reproduction processing in parallel with the processing of the binary regions. The processed image data are then combined to produce output picture element data.

Tone reproduction processing of multilevel image data such as by dithering methods can be accomplished in the time required for data transmission if, for example, a lookup table type method is used. In contrast, where smoothing processing of halftone image data is performed by determining data values of a target picture element based on the surrounding picture elements, more time may be required for processing than is required for data transmission of a plurality of lines.

Accordingly, when smoothing processing of halftone images and tone reproduction processing of multilevel images are performed in parallel, the output timing of individual picture elements must be matched when combining the image data processed by the aforesaid processes. Therefore, the output data of the tone reproduction process which requires less time may have to be delayed for a predetermined period of time.

When using a tone reproduction process wherein picture elements of an input image are divided into n segments as in the previously mentioned IH method, the frequency of the output synchronization signal of the tone reproduction processor is N times the frequency of the input synchronization signal, such that high-speed operation of a data delay device is required and the number of delay steps for delaying a predetermined time is increased N times. However, data delay devices (e.g., first in first out memories (FIFO memory), shift registers, or the like) which are capable of high-speed operation and which execute many delay steps are very expensive. Thus, a disadvantage arises inasmuch as greatly increased cost of the image processor is unavoidable.

A method has been proposed wherein, in a system which is connected to a printer and an image forming device (host) such as a computer, word processor or the like, region-defining data can be appended to image data beforehand on the host side. Based on said region-defining data, the image data is separated into binary regions and halftone regions on the printer side. Mutually different image processing is performed on the data of each of said regions (Japanese Unexamined Patent Application No. HEI 5-30354).

When a smoothing process is accomplished by the aforesaid filtering, the image processing circuits which perform the calculation of multiplying the coefficient of the multi-level data become more complex and it is difficult to render them inexpensive. Furthermore, in considering the influences on later stage tone reproduction processing, it is necessary to optimize the smoothing coefficient.

In addition, when region-defining data is appended to the image data, data processing becomes more complex, and is inconvenient for wide-spread use.

SUMMARY

According to one aspect of the present invention, an image processor is disclosed which eliminates the previously described disadvantages by providing, for example, an inexpensive image processor using a low-speed delay device capable of delaying data only for the time difference between processing times of a plurality of parallel image processing methods requiring different processing times.

Image data input to a first image processing section are delayed for a constant time by the data delay section. At this time, the data delay section performs a delay operation synchronized with a first clock signal.

On the other hand, image data input to a second image processing section is not delayed. The required processing time of the second image processing section is longer than that of the first image processing section by a constant time, such that processing of image data corresponding to the same region of an image is completed at the same time by the first image processing section and the second image processing section. Thus, image data which have been simultaneously processed by each of said processes are combined in a data combining section, and are transmitted to an image forming system.

According to another aspect of the invention, the image processor eliminates the aforesaid disadvantages by simplifying circuit construction for image processes suitable for binary regions and halftone regions within an image to provide an inexpensive image processor.

A data separator allocates image data corresponding to individual picture elements to the first image processing unit and the second image processing unit according to the magnitude of the data value of a single picture element.

Image data equal to or less than a constant value are input to the first image processing unit as the processing object. Image data exceeding said constant value are input to said second image processing unit as the processing object.

Image data processed for tone reproduction by said first image processing unit and image data processed for smoothness by said second image processing unit are combined by a data combining unit and output to a device for image forming.

BRIEF DESCRIPTION OF THE DRAWING FIGURES

The invention will be described in greater detail with reference to the accompanying drawings in which like elements bear like reference numerals, and wherein.

DETAILED DESCRIPTION OF THE PREFERRED EMBODIMENTS

Figure 1:
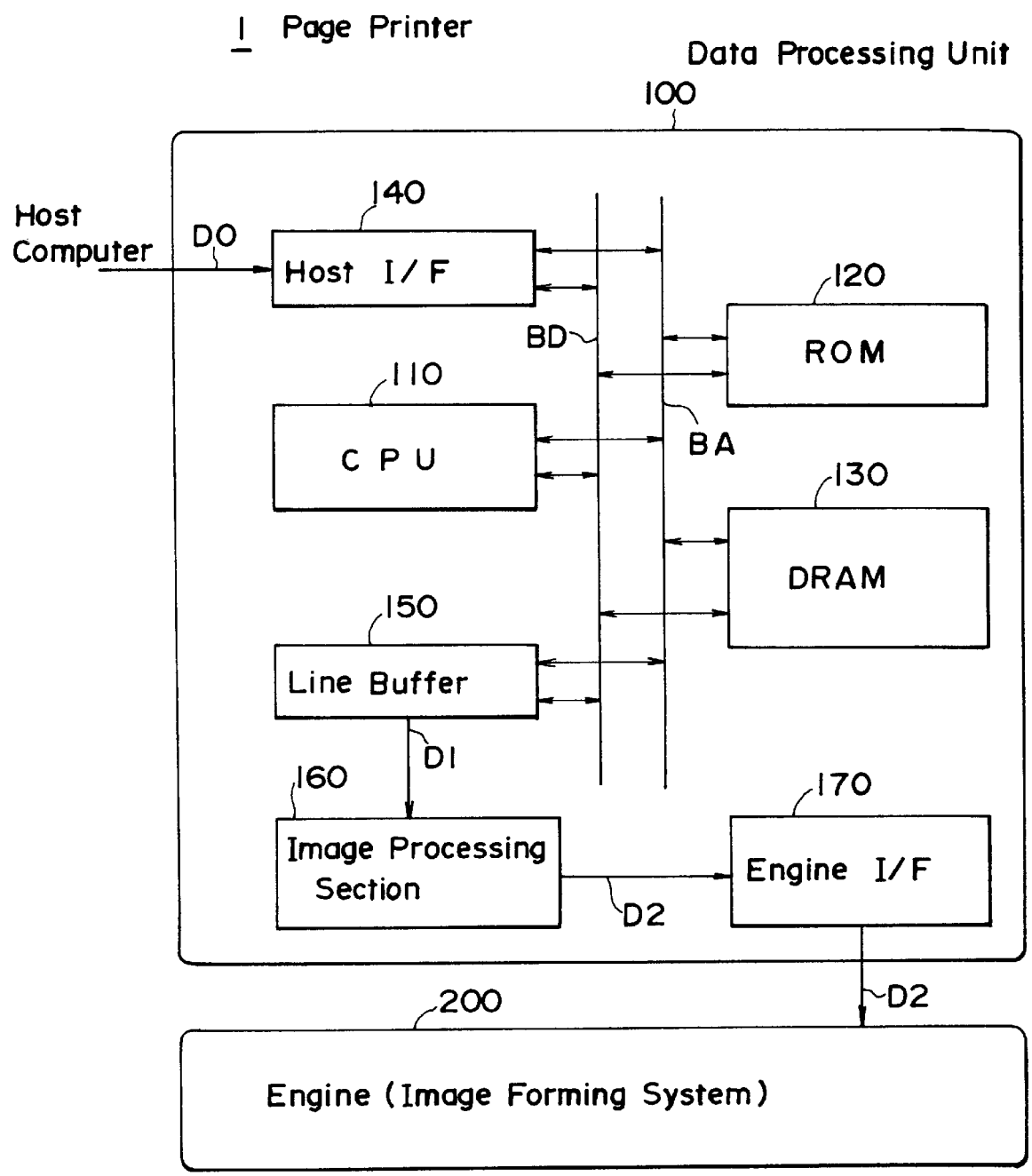
FIG. 1 is a block diagram showing the construction of a page printer provided with an image processor of the present invention.

FIG. 1 is a block diagram showing the construction of a page printer 1 provided with an image processing section 160 of the present invention.

Page printer 1 comprises a data processing unit 100 which analyzes print data (image information and commands) D0 input from an external host computer, and an engine (image forming system) 200 for printing an image corresponding to output image data D2 on paper.

Data processing unit 100 comprises a central processing unit (CPU) 110 which controls data processing unit 100, a ROM 120 for storing programs, a DRAM 130 for temporarily storing various types of data, a host interface 140 for communicating with the host, a line buffer 150 for data transfer, an image processing section 160 for improving image reproducibility, an engine interface 170 for communicating with engine 200, a data bus BD, and an address bus BA. CPU 110 functions as a print controller which manages all operations of page printer 1. DRAM 130 is used as a receiving buffer and a frame buffer (bit map area) or the like.

CPU 110 reads and analyzes print data D0 from the receiving buffer, e.g., interprets page description language, and expands character codes and the like into dot images formed on the frame buffer area in DRAM 130. When bit map expansion of one page is completed, CPU 110 reads image data D1 from DRAM 130 and transmits the read data D1 to image processing section 160. Image processing section 160 executes tone reproduction processes and smoothing processes relative to said image data D1, and outputs binary output image data D2 to engine interface 170. Output image data D2 is transferred by engine interface 170 to engine 200.

Engine 200 is provided with an image forming unit using an electrophotographic process, and a sheet feeding unit for transporting paper (recording sheet), and is constructed for full color printing. When image data D2 output from data processing unit 100 is input to engine 200, electrostatic latent image formation (optical exposure) starts, and thereafter paper sheets are sequentially transported from a transfer position to a fixing position and subsequently through a discharge opening in conjunction with the progress of the image forming process (i.e., developing, transfer, fixing processes). When outputting full color images, toner images of each developing color yellow (Y), magenta (M), cyan (C), and black (K) are sequentially formed color by color to form an overlay of four color toner images on a recording sheet.

Figure 2:
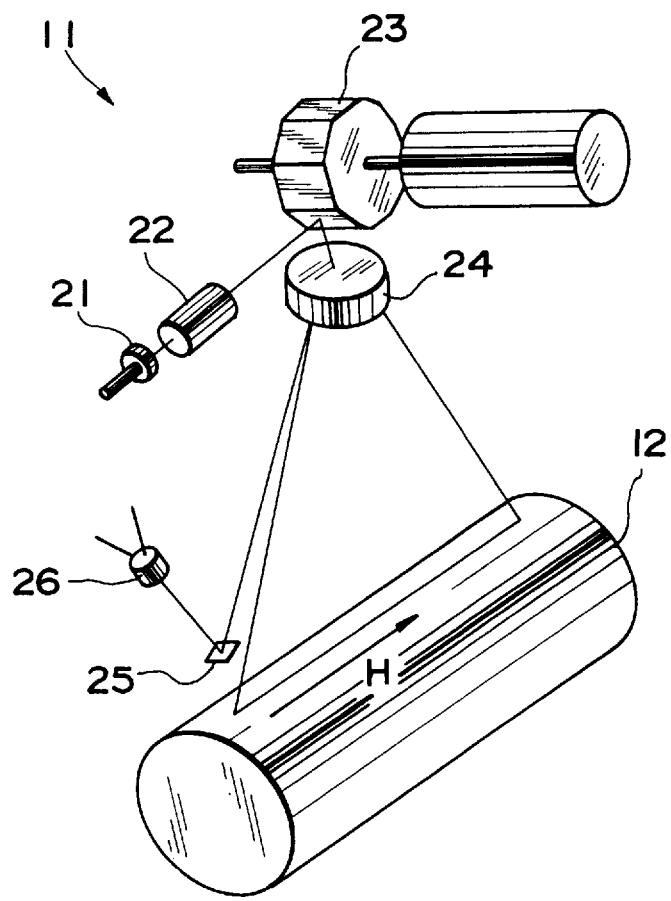
FIG. 2 is a perspective view illustrating an optical scanning unit incorporated in an engine.

FIG. 2 is a perspective view which illustrates the optical scanning unit 11 included in engine 200.

The light source used in the optical exposure process in engine 200 is a semiconductor laser 21. Semiconductor laser 21 is controlled in accordance with output image data D2 transmitted from data processing unit 100, and emits a laser beam subject to two-state modulation (ON/OFF). The laser beam is collimated by a collimating lens 22, and is deflected in the main scanning direction by a rotating polygonal mirror 23. The deflected beam passes through an image forming lens 24 and forms an image on the surface of a photosensitive drum 12 (electrostatic latent image bearing member) which rotates unidirectionally. Image forming lens 24 is a type of fθ lens, such that the beam scans in sequential lines. During beam scanning, the light at the starting edge of each scan line of the beam is reflected by a mirror 25, and directed to a detector 26. A detection signal output by detector 26 is used to set the timing of a line clock SH which is the synchronization signal for scanning in the horizontal (main scan) direction.

Figure 3:
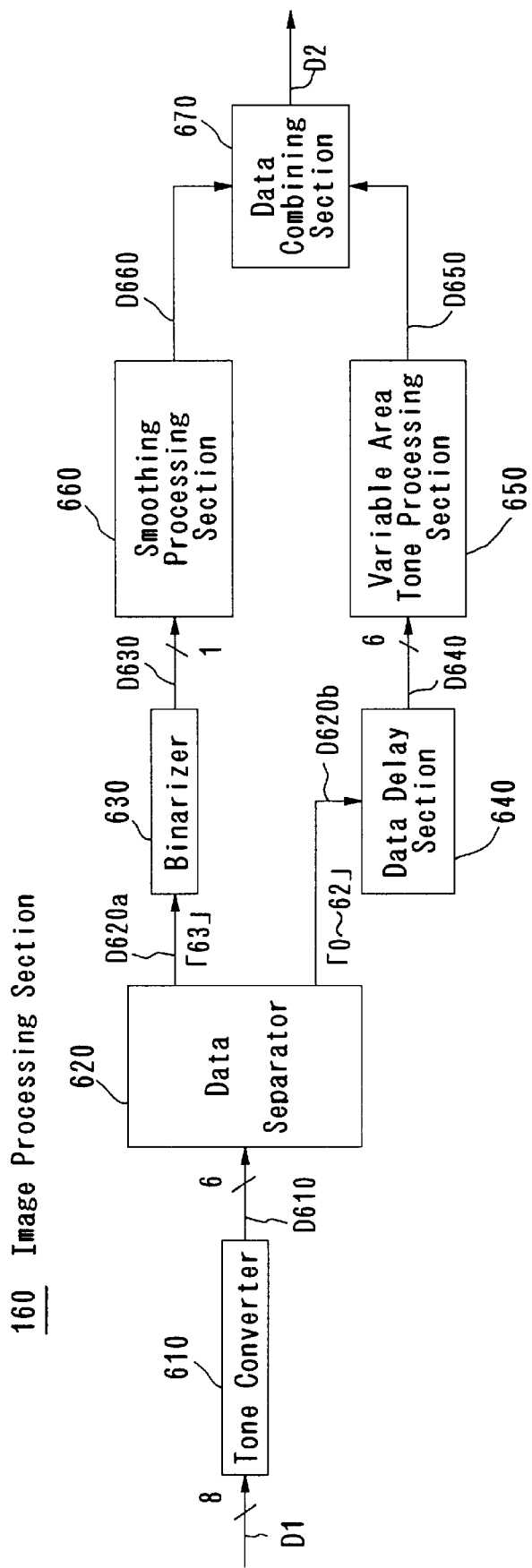
FIG. 3 is a block diagram of an image processing section according to the present invention.

FIG. 3 is a block diagram of image processing section 160. Image processing section 160 comprises a tone converter 610, a data separator 620, a binarizer 630, a data delay section 640, a variable area tone processing section 650, a smoothing process section 660, and a data combining section 670.

Tone converter 610 comprises a ROM or the like for storing conversion table data, and converts 8-bit image data D1 of each input picture element (256 tones) into 6-bit image data D610 (64 tones). Input image data D1 expresses the density of each picture element of the original image, and are serially input in 8-bit blocks for each picture element from line buffer 150 in the picture element array sequence of the line sequence scan. Output data image data D610 are output simultaneously to picture element clock SYNCK for standardizing the transfer cycle of one picture element (see FIG. 5).

Data separator 620 divides a one page image into binary regions, such as lettering and line images, and halftone regions, such as photographs, and is provided to accomplish different image processing of each of said regions. In the present embodiment, image data D610 comprises 64 tones having density values of [0] to [63] wherein the maximum density is [63], and said image data D610 of said maximum density [63] are transmitted to binarizer 630 as image data D620a corresponding to a binary region. Image data D610 of densities other than maximum density, i.e., density values [0] to [62], are transmitted to data delay section 640 as image data D620b corresponding to a halftone region. That is, each picture element is allocated according to its density.

When image data D610 are output as image data D620a, the value of image data D620b is [0], whereas when image data D610 is output as image data D620b, the value of image data D620a is [0]. This function of data separator 620 allows, for example, realization of combined logical circuits and multiple output selectors.

Binarizer 630 converts 6-bit image data D620a ([63] and [0]) to 1-bit image data D630 ([1] and [0]), and transmits this data to smoothing process section 660. Data delay section 640 delays halftone image data D620a, and transmits this data to variable area tone processing section 650.

Smoothing process section 660 executes a smoothing process on binary image data D630. Variable area tone process section 650 executes a variable area tone process on image data D640 input through data delay section 640. The construction of smoothing process section 660, area tone process section 650, and data delay section 640 are described further below.

Data combining section 670 comprises, for example, logical circuits or the like, and combines the logical OR of 1-bit image data D650 and D660 respectively output from variable area tone process section 650 and smoothing process section 660 to create output image data D2. Output image data D2 is used in modulation control of the aforesaid scanning beam.

Figure 4:
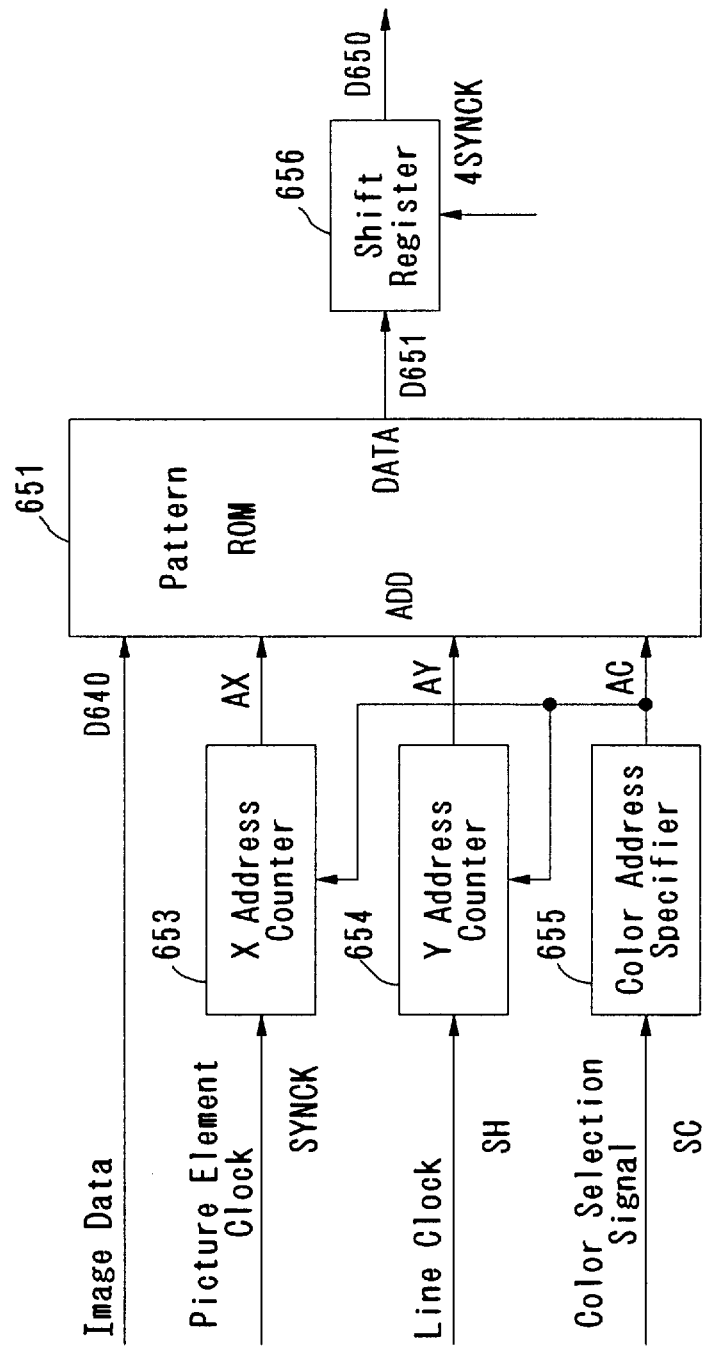
FIG. 4 is a block diagram of a variable area tone process section according to the present invention.
Figure 5:
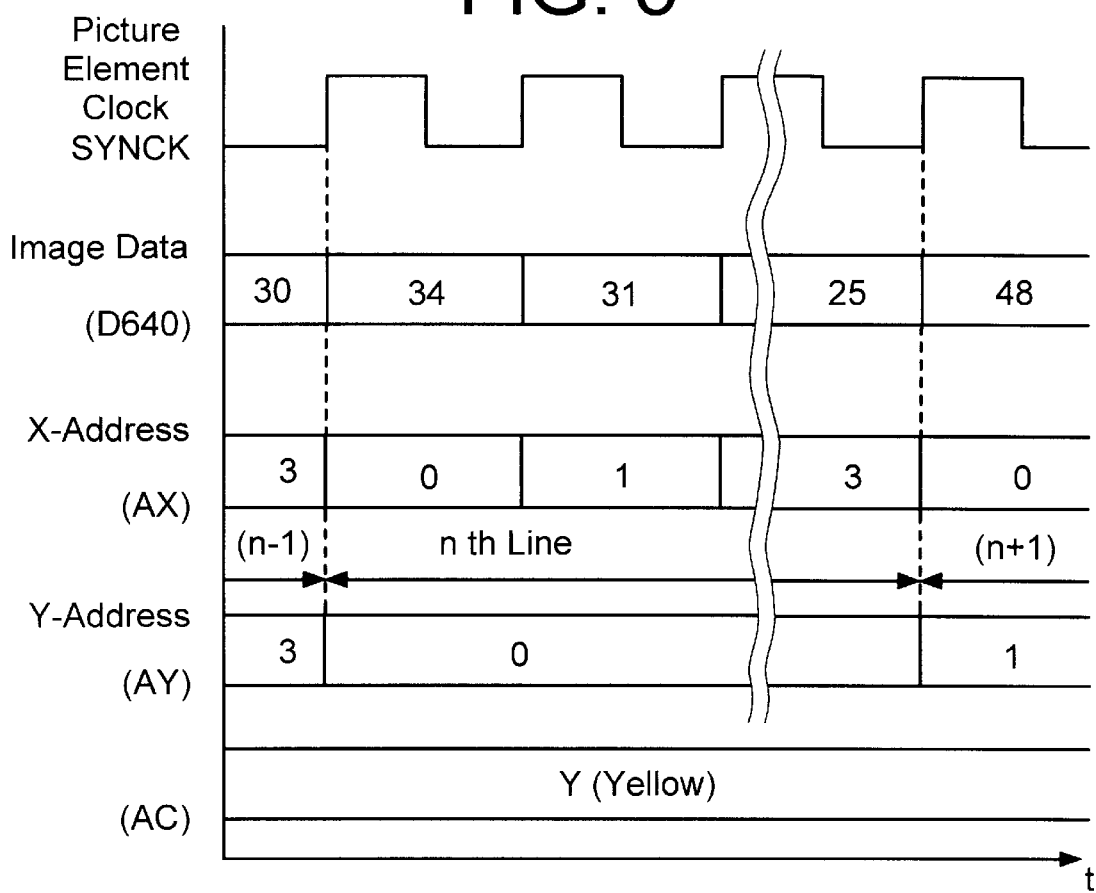
FIG. 5 is a timing chart of the address specifications according to the present invention.
Figure 6:
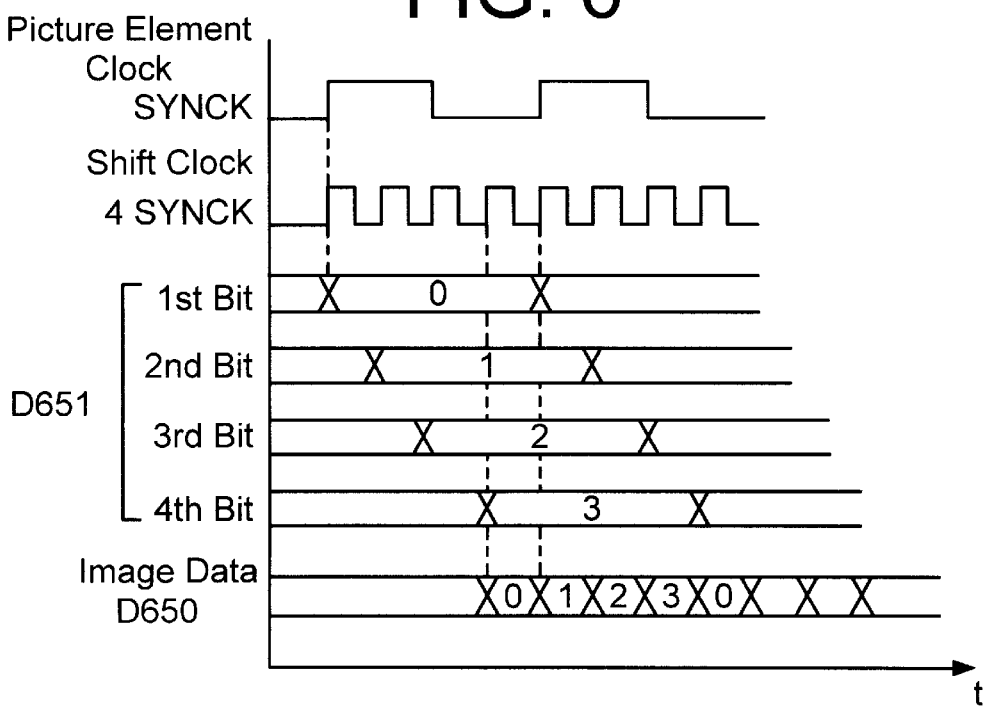
FIG. 6 is a timing chart of the shift register operation of the present invention.

FIG. 4 is a block diagram of variable area tone processing section 650. FIG. 5 is a timing chart of address specification, and FIG. 6 is a timing chart for the operation of shift register 656.

Variable area tone processing section 650 of FIG. 4 comprises a pattern ROM 651, an X address counter 653, a Y address counter 654, a color address specifier 655, and a shift register 656.

The content of the variable area tone processing section 650 of the present embodiment realizes tone reproduction basically by a dot concentration type matrix. A technique for providing different patterns at exposure positions with identical total exposure times as exposure patterns for a matrix area is used to greatly increase the number of tones without reducing resolution. A tone recording method is disclosed in U.S. patent application Ser. No. 08/323,924, which is incorporated herein by reference.

Pattern ROM 651 is provided as an output density setting means for setting the density of a print image, and stores a plurality of exposure patterns (dither patterns) of m×n matrices corresponding to various tones and developing colors. The section DT of m×n elements comprising the matrix comprises k individual elements EM, wherein k is the number of divisions of picture elements. In the following discussion, the value of k is 4 (k=4).

An exposure pattern group corresponding to a single tone level is specified by image data D640, and an exposure pattern group suitable for a developing color is specified by color address AC output by color address specifier 655. As a result, a single exposure pattern is specified. At the same time, one section among the m×n individual section DT comprising the specified exposure pattern is specified by x address AX, and Y address AY. The 4-bit image data (modulation data) D651 expressing the exposure pattern among the specified single section DT is synchronized by picture element clock SYNCK and read out.

The X address AX is the count value of picture element clock SYNCK set by X address counter 653. X address counter 653 repeatedly counts within a predetermined value range in accordance with the number of individual sections DT arrayed in a horizontal direction (line direction, or main scan direction) of the exposure pattern. For example, if the size of the exposure pattern PS is 4×4 (vertical x horizontal), the count is repeated within a value range of 0–3, as shown in FIG. 5.

The Y address AY is the count value of line clock SH set by Y address counter 654. Y address counter 654 repeatedly counts within a predetermined value range in accordance with the number of individual sections DT arrayed in a vertical direction (column direction, perpendicular direction, or sub scan direction) of the exposure pattern. For example, if the size of the exposure pattern PS is 4×4 (vertical x horizontal), the count is repeated within a value range of 0–3, as shown in FIG. 5.

The maximum count values of X address counter 653 and Y address counter 654 change in accordance with the color address AC output by the color address specifier 655. Thus, the screen angle can be changed to improve color reproducibility by using matrices of different sizes in accordance with the developing color of the color selection signal SC.

The 4-bit image data D651 read out from pattern ROM 651 are input to shift register 656 synchronously with picture element clock signal SYNCK. Shift register 656 shifts the data of image data D651 synchronously with shift clock 4SYNCK, and outputs 1-bit data serially as image data 650, as shown in FIG. 6.

Shift clock 4SYNCK is a pulse signal having a frequency four times that of the picture element clock SYNCK. That is, in variable area tone processing section 650 the output data transfer cycle is ¼ the transfer cycle of input data.

Figure 7:
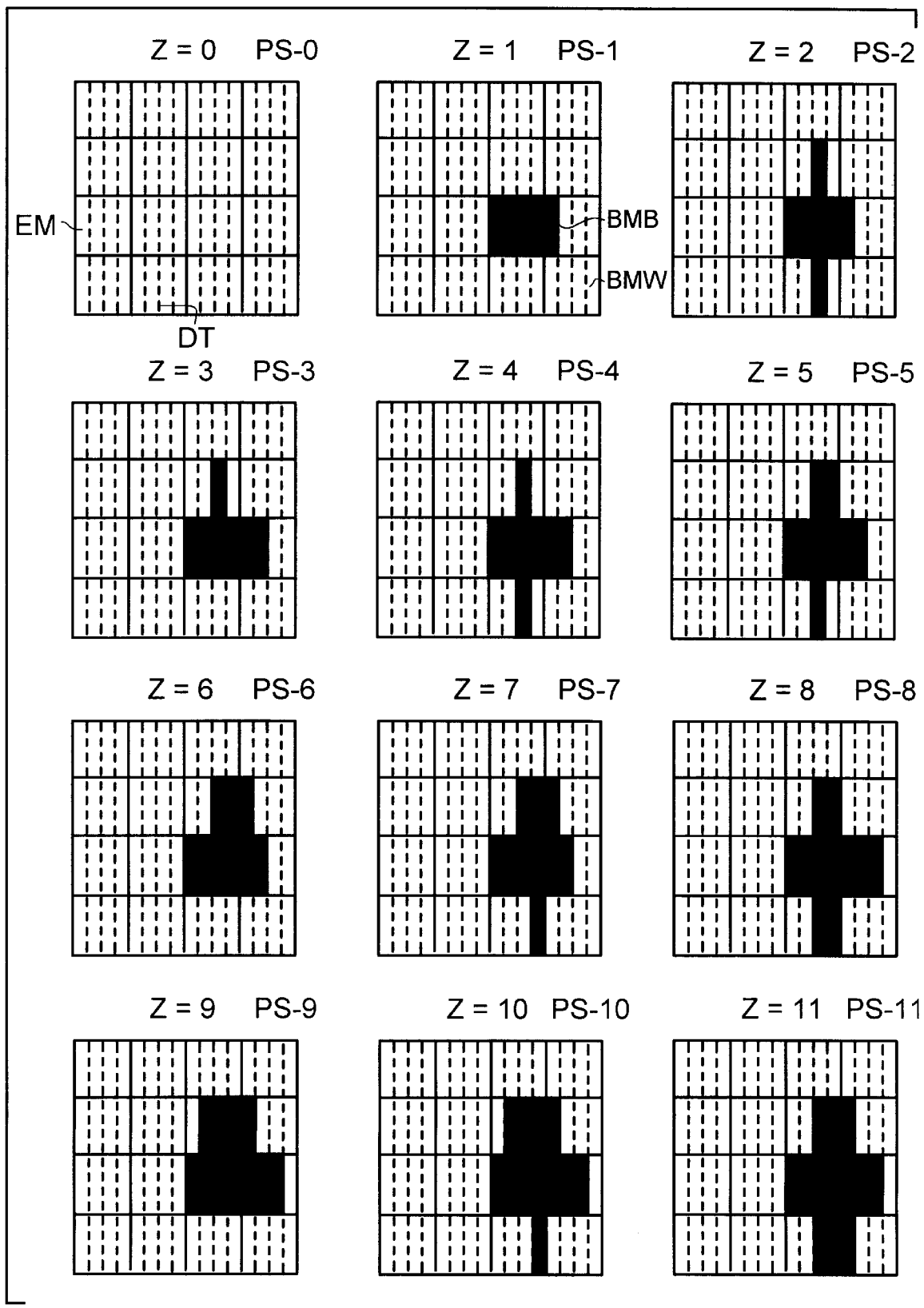
FIG. 7 is an illustration of examples of exposure patterns.

FIG. 7 is an illustration showing examples of exposure patterns. The exposure patterns stored in pattern ROM 651 are described hereinafter.

Exposure patterns PS0-PS11 shown in FIG. 7 are patterns corresponding to tone levels Z0–Z11 on the low density side among the 64 tone levels Z0–Z63 of the image data. The exposure patterns PS0–PS11 divide each section DT of a square matrix comprising four individual sections DT in vertical and horizontal directions into 4 quadrants in the horizontal direction, and four small sections form elements EM of the 4×(4×4) size matrix. Each element EM has a value of [0] or [1]. In the illustration of FIG. 7, elements EM which are [0] are white and those which are [1] are black. A

[0] element EM indicates semiconductor laser is OFF, and a [1] element EM indicates semiconductor laser 21 is ON. On the surface of photosensitive drum 12, the region corresponding to elements EM at which semiconductor laser 21 is ON is exposed and its potential is reduced, such that toner of a predetermined color adheres to the exposed portions. On the other hand, the regions corresponding to element EM at which semiconductor laser 21 is OFF are not exposed and remain the background color (usually white) on the recording sheet. Hereinafter, elements EM having a value of [0] are designated as white elements (EMW), and elements EM having a value of [1] are designated as color elements (EMB).

At this point one must be aware that the area of an image rendered visible on a recording sheet corresponding to a single color element EMB differs depending on whether or not the element adjacent to said color element EMB is a white element EMW or color element EMB, and differs depending on whether or not the adjacent position is right, left, above, or below.

The reason for the aforesaid situation is that there is an increase of the energy of the laser beam in the center region and a reduction of the energy on the edges of the laser beam. Elements EM on the same line as the exposure line scanned are consecutively scanned, whereas elements EM of mutually different lines are positioned with a mutual spacing interval and are discretely scanned. Therefore, when color elements EMB are adjacent in a horizontal direction, the exposure energy of the laser beam is increased by mutual addition, such that the maximum exposure energy is increased. In contrast, when color elements EMB are adjacent in a vertical direction, the total exposure energy is not increased. Therefore, even though the number of color elements EMB are the same and the total exposure time is the same, the maximum exposure energy is increased when color elements EMB are consecutively arrayed in a horizontal direction, whereas the maximum exposure energy is less when color elements EMB are arrayed in a vertical direction. Accordingly, an electrostatic latent image is formed on the surface of photosensitive drum 12 by different exposure energies even though the total exposure time is the same.

When the electrostatic latent images formed by mutually different exposure energies are developed, the latent images are rendered visible by toner which adheres only to the regions which have been exposed to energy in excess of a certain threshold value in accordance with the sensitivity of photosensitive drum 12 and the magnitude of the developing bias. As a result, the areas of the images recorded on a recording sheet are different due to their position even though the numbers of color elements EMB are identical.

In page printer 1 of the present embodiment used for the aforesaid developing, a plurality of exposure patterns PS having mutually identical total numbers of color elements EMB record mutually different tones by mutually different positions of said color elements EMB.

Figure 8:
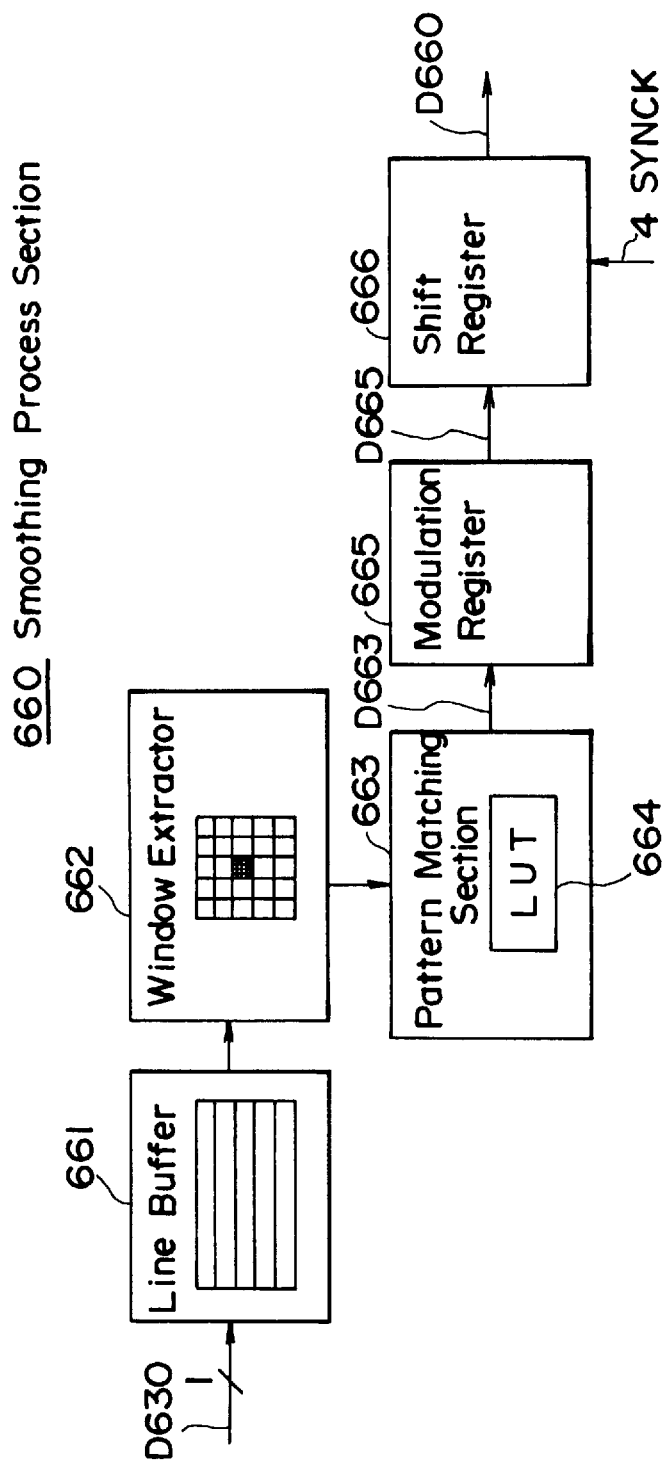
FIG. 8 is a block diagram of the smoothing processing section of the present invention.

FIG. 8 is a block diagram of smoothing process section 660. Smoothing process section 660 is provided with line a buffer 661, a window extractor 662, a pattern matching section 663, a modulation register 665, and a shift register 666. Smoothing process section 660 executes a pipeline type smoothing process using a p×q (e.g., 5×5) window.

Line buffer 661 stores only the required number of lines of binary image data D630 input previously. Window extractor 662 reads from line buffer 661 the image data D630 corresponding to the target picture element and a predetermined number of picture elements surrounding said target element, and transmits said data to pattern matching section 663.

Pattern matching section 663 is provided with a lookup table 664 corresponding to input and smoothing results, and outputs data D663 corresponding to the combined data values in the window.

Modulation register 665 is provided to optimize smoothing in accordance with image forming characteristics of engine 200, and outputs corrected data D663 as image data D665.

Shift register 666 is provided to match the data output cycle with the aforesaid variable area toner processing section 650, and outputs one picture element of image data D665 at ¼ the input cycle as image data D660 each fourth cycle.

When using, for example, a 5×5 window in smoothing process section 660 of the aforesaid construction, image data D630 of the line of following the line containing the target picture element and the next line thereto are stored in line buffer 661, thereby at that moment allowing extraction of peripheral picture elements corresponding to the window. That is, a three line data delay is created by accumulating data in line buffer 661. When latching and the like are included, data delay is sequentially created for four picture elements, two picture elements, and one picture element in window extractor 662, pattern matching section 663, and shift register 666.

In contrast, in variable area tone processing section 650, data delay is created for a total of two picture elements one at a time in pattern ROM 651 and shift register 656.

Therefore, the time required for the variable area tone process (first image process) is shorter than the smoothing process because the variable area tone process requires only the time to transfer (3 lines +5 picture elements) data.

In the image processing section 160 of FIG. 3, input data delay section 640 is provided for variable area tone process section 650 to correct the differences in the required time for each process to match the timing for data combination.

Figure 9:
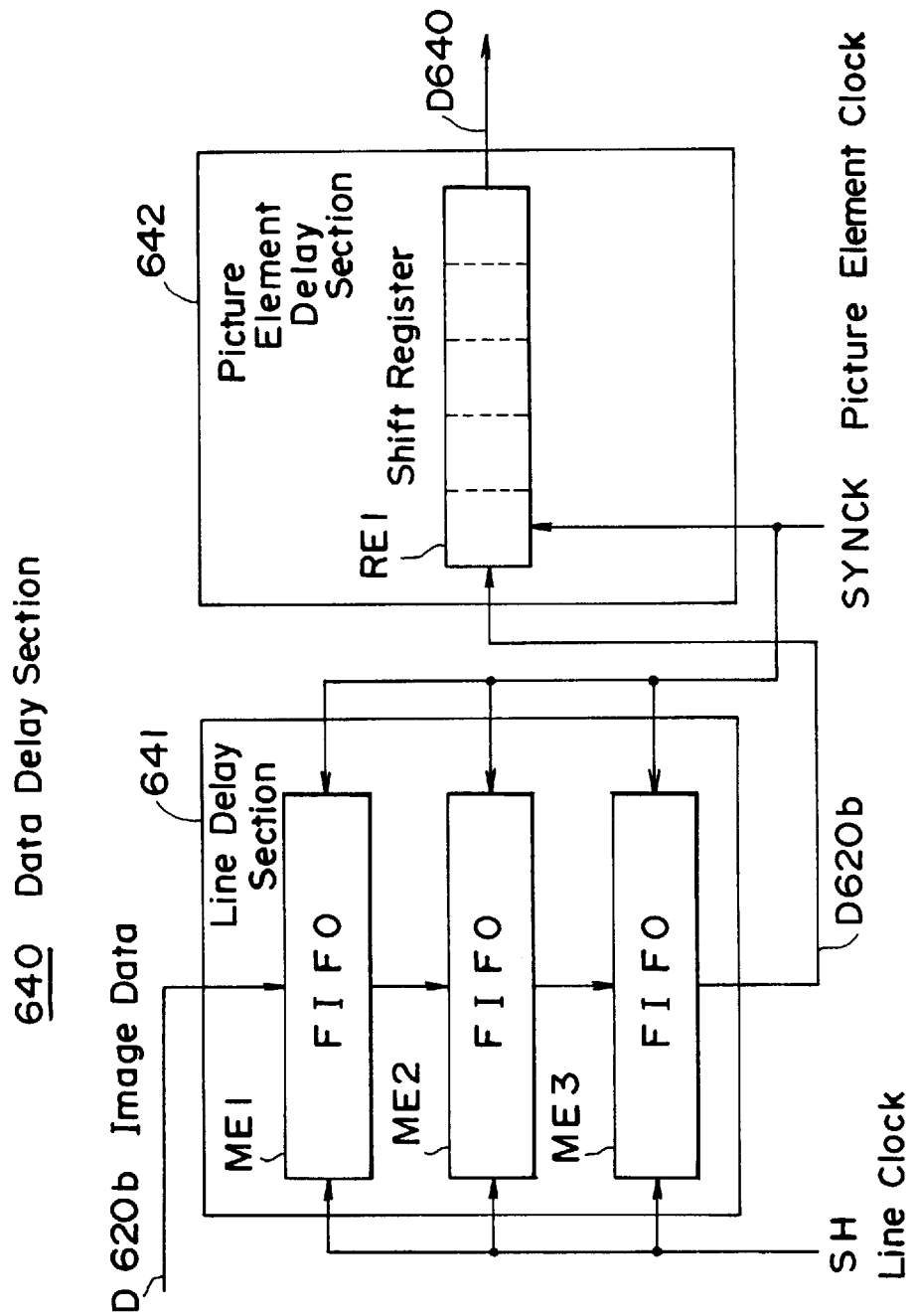
FIG. 9 is a block diagram of the data delay section according to the present invention.

FIG. 9 is a block diagram of data delay section 640. Data delay section 640 comprises line delay section 641 for 3-line data delay, and picture element delay section 642 for 5-picture element data delay.

Line delay section 641 comprises three FIFO memories ME1–ME3 having 1-line data capacities. Image data D620 which is the delay object is input to FIFO memory ME1, then sequentially transferred to FIFO memories ME1 and ME3. In each FIFO memory ME1–ME3, the address counter value is reset by a line clock SH input.

Picture element delay section 642 comprises 5-step shift register RE1 for shift operation synchronized by picture element clock SYNCK. Image data D620b input from line delay section 641 are delayed only five cycles of picture element clock SYNCK, and thereafter are transmitted to variable area tone process section 650 as image data D640.

A device may be used which is operated by the picture element clock SYNCK by providing data delay section 640 on the input side of variable area tone process section 650, and a less expensive data delay section 640 can be realized compared to when high-speed operation four times that of the input side is required on the output side.

In the present embodiment, a variable area tone process and smoothing process are described, however, the present invention may be applied when a plurality of image processes are executed wherein the required processing times are different, i.e., when a data transfer cycle of a first processing is shorter than that of a second processing when processing is conducted is series. The IH method mentioned previously in the description of the related art may be used as a tone reproduction method.

In the present embodiment, the amount of delay of the data delay section 640 may be suitably set in accordance with the content of the image process, and is not limited to the numerical values mentioned in the previous description. Data delay section 640 may be divided between pattern ROM 651 and shift register 656 of variable area tone process section 650. In such a situation, the required bits per one picture element of data delay section 640 may be decreased from 6-bits to 4-bits. When variable area tone process section 650 is provided on the input side as in the previously described embodiment, the construction of data delay section 640 can be changed and the amount of delay optionally set without changing the construction of variable area tone process section 650. Thus, even when, for example, the circuit construction of variable area tone process section 650 is fixed by integration and the like, the content of the smoothing process can be changed (e.g., changing window size and the like), thereby increasing the amount of freedom to change specifications of page printer 1.

In the above embodiment, the separation threshold value of data separator 620 is set at [62], and image data D610 of maximum value [63] is allocated to the smoothing process. However, image data D610 of a constant range of values, such as [60]–[63], on the maximum value side may be allocated to the smoothing process, and image data D610 having values, such as [59] and less, may be allocated to the variable area tone process.

The present invention provides that when a plurality of image processes requiring different processing times are executed in parallel and the image data transfer cycle after processing is shorter than that before processing, a low-speed delay device is used to realize data delay for the difference between the required processing times, thereby achieving an inexpensive image processor.

The present invention provides an inexpensive image processor by simplifying circuit construction for image processes suitable for binary regions and halftone regions within an image.

While the invention has been described in detail with reference to preferred embodiments thereof, it will be apparent to one skilled in the art that various changes can be made, and equivalents employed without departing from the spirit and scope of the invention.

What is claimed is:

1. An image processor comprising:
   a first image processing section for accomplishing a first image process of image data input synchronously with first clock signals, and which outputs first processed image data synchronously with second clock signals having a frequency higher than said first clock signals;
   a second image processing section for accomplishing a second image process of image data input synchronously with said first clock signals, and which processes in parallel with said first image process and outputs second processed image data synchronously with said second clock signals;
   a data combining section for combining image data respectively output from said first image processing section and said second image processing section; and
   a data delay section provided at an upstream side of said first image processing section to delay image data for a period of time corresponding to a difference in required processing times between said first image process and said second image process.

2. The image processor as claimed in claim 1, further comprising a data separator for dividing image data into first image data corresponding to halftone image regions and second image data corresponding to binary image regions, said first image data being transmitted to said first image processing section and said second image data being transmitted to said second image processing section.

3. The image processor as claimed in claim 2, wherein said first image processing section binarizes the first image data by using a variable area tone method, and said second image processing section executes a smoothing process with respect to the second image data.

4. The image processor as claimed in claim 3, wherein said first image processing section includes a pattern memory for storing a plurality of dither patterns, one of said dither patterns being selected in accordance with a value of the first image data.

5. The image processor as claimed in claim 4, wherein said value is a density value.

6. The image processor as claimed in claim 2, wherein said data separator divides image data in accordance with a value of the image data.

7. The image processor as claimed in claim 6, wherein said value is a density value.

8. An image processor comprising:
   generating means for generating dot image data to be printed;
   printing means for printing an image line by line in accordance with said dot image data;
   data dividing means for dividing said dot image data into first dot image data and second dot image data;
   a first image processing section for receiving the first dot image data synchronously with first clock signals, accomplishing a first image process with respect to said first dot image data, and outputting processed first image data synchronously with second clock signals having a frequency higher than said first clock signals;
   a second image processing section for receiving the second dot image data synchronously with said first clock signals, accomplishing a second image process with respect to said second dot image data in parallel with said first image process, and outputting processed second image data synchronously with said second clock signals;
   a data combining section for combining processed first and second image data respectively output from said first image processing section and said second image processing section and transmitting combined image data to said printing means; and
   a data delay section provided at an upstream side of said first image processing section to delay image data for a period of time corresponding to a difference in required processing times between said first image process and said second image process.

9. The image processor as claimed in claim 8, wherein said first dot image data corresponds to halftone image regions and said second image data corresponds to binary image regions.

10. The image processor as claimed in claim 9, wherein said first image processing section binarizes the first dot image data by using a variable area tone method, and said second image processing section executes a smoothing process with respect to the second dot image data.

11. The image processor as claimed in claim 10, wherein said first image processing section includes pattern memory for storing a plurality of dither patterns, one of said dither patterns being selected in accordance with a value of the first image data.

12. The image processor as claimed in claim 11, wherein said value is a density value.

13. The image processor as claimed in claim 8, wherein said data dividing means divides image data in accordance with a value of the dot image data.

14. The image processor as claimed in claim 13, wherein said value is a density value.

15. The image processor as claimed in claim 8, wherein said dividing means includes line delay section for delaying the first dot image data for predetermined number of lines, and dot delay section for delaying the first dot image data for predetermined number of dots.

16. The image processor as claimed in claim 15, wherein said line delay section has a FIFO memory and said dot delay section has a shift register.

17. An image processor comprising:

a first image processing section for processing to achieve tone reproduction relative to multi-level image data expressing the density of each picture element;

a second image processing section for processing to achieve smoothing relative to binary image data obtained by binarizing said image data;

a data separator for outputting said image data less than a predetermined density value to said first image processing section, and outputting image data equal to said predetermined density value to said second image processing section; and a data combining section for combining image data respectively output from said first image processing section and said second image processing section.

18. The image processor as claimed in claim 17, wherein said predetermined density value is a maximum density value.

19. An image processor comprising:

a first image processing section for processing to achieve tone reproduction relative to multi-level image data expressing the density of each picture element;

a second image processing section for processing to achieve smoothing relative to binary image data obtained by binarizing said image data;

a data separator for outputting said image data less than a predetermined density value to said first image processing section, and outputting image data equal to said predetermined density value to said second image processing section; and a data combining section for combining image data respectively output from said first image processing section and said second image processing section;

wherein said first image processing section binarizes the image data by using a variable area tone method.

20. The image processor as claimed in claim 19, wherein said first image processing section includes pattern memory for storing a plurality of dither patterns, one of said dither patterns being selected in accordance with a density value of the first image data.

* * * * *